US 9,488,299 B2

(12) United States Patent
Graham (10) Patent No.: US 9,488,299 B2
(45) Date of Patent: Nov. 8, 2016

(54) ARMOUR REINFORCEMENT (75) Inventor: Geoffrey Stephen Graham, Tyne & Wear (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 609 days.

(21) Appl. No.: 13/128,842

(22) PCT Filed: Oct. 30, 2009

(86) PCT No.: PCT/GB2009/051469
§ 371 (c)(1),
(2), (4) Date: May 11, 2011

(87) PCT Pub. No.: WO2010/055324
PCT Pub. Date: May 20, 2010

(65) Prior Publication Data
US 2011/0214771 A1  Sep. 8, 2011

(30) Foreign Application Priority Data

Nov. 12, 2008  (GB) .................................. 0820671.6

(51) Int. Cl.
F16L 11/16 (2006.01)
F16L 11/08 (2006.01)
E21B 17/01 (2006.01)

(52) U.S. Cl.
CPC .............. *F16L 11/083* (2013.01); *E21B 17/01* (2013.01); *F16L 11/16* (2013.01); *Y10T 29/49435* (2015.01); *Y10T 137/0318* (2015.04)

(58) Field of Classification Search
CPC . F16L 11/16; F16L 11/083; Y10T 29/49428; Y10T 29/49435
USPC ....... 138/129–131, 133, 134, 135, 137, 109, 138/144, 172, 174; 29/890.144; 405/224.3; 464/174; 174/109
See application file for complete search history.

(56) References Cited

U.S. PATENT DOCUMENTS 1,145,434 A * 7/1915 Pechstein ...................... 138/131
4,514,245 A * 4/1985 Chabrier ....................... 156/161
(Continued)

FOREIGN PATENT DOCUMENTS

CN    1392358 A    1/2003
CN    1732352 A    2/2006
(Continued)

OTHER PUBLICATIONS

International Preliminary Report on Patentability and Written Opinion of the International Searching Authority, mailed May 26, 2011, for corresponding International Application No. PCT/GB2009/051469, 8 pages.

(Continued)

*Primary Examiner* — Kevin P Shaver
*Assistant Examiner* — Robert Nichols, II
(74) *Attorney, Agent, or Firm* — Klarquist Sparkman, LLP (57) ABSTRACT A method for manufacturing flexible pipe body and flexible pipe body of a type suitable for transporting production fluids is disclosed. The flexible pipe body includes an armour layer comprising interlocked windings of armour tape comprising at least one armour locating element and a reinforcement layer comprising a layer of reinforcement tape comprising at least one reinforcement locating element over the armour layer. The armour locating element and reinforcement locating element locate windings of the reinforcement tape with respect to respective windings of the armour tape.

22 Claims, 4 Drawing Sheets (56) References Cited

U.S. PATENT DOCUMENTS

| | | | | |
|---|---|---|---|---|
| 4,537,223 | A | * | 8/1985 | Sumitani ............... 138/139 |
| 5,730,188 | A | | 3/1998 | Kalman et al. |
| 5,934,335 | A | * | 8/1999 | Hardy ................. 138/131 |
| 6,006,788 | A | * | 12/1999 | Jung et al. ............. 138/131 |
| 6,024,135 | A | * | 2/2000 | Nobileau ............... 138/134 |
| 6,253,793 | B1 | | 7/2001 | Dupoiron et al. |
| 6,691,743 | B2 | * | 2/2004 | Espinasse ............... 138/134 |
| 7,318,454 | B2 | * | 1/2008 | Dupoiron ............... 138/135 |
| 8,459,306 | B2 | * | 6/2013 | Clements et al. ........ 138/135 |
| 2004/0221907 | A1 | | 11/2004 | Glejbol et al. |
| 2005/0097720 | A1 | * | 5/2005 | Coutarel et al. ......... 29/450 |
| 2009/0000683 | A1 | * | 1/2009 | Sheldrake ............... 138/129 |

FOREIGN PATENT DOCUMENTS

| | | |
|---|---|---|
| CN | 200972020 Y | 11/2007 |
| CN | 101243278 A | 8/2008 |
| DE | 309384 C | 11/1918 |
| EP | 1141606 B1 | 3/2004 |
| FR | 757991 A | 1/1934 |
| FR | 2784445 A1 | 4/2000 |
| FR | 2904992 A1 | 2/2008 |
| WO | WO99/57475 | 11/1999 |
| WO | WO02/088659 A2 | 11/2002 |
| WO | WO2008/077409 A1 | 7/2008 |
| WO | WO2008/077410 | 7/2008 |
| WO | WO2009/024156 A2 | 2/2009 |

OTHER PUBLICATIONS

International Search Report and Written Opinion of the International Searching Authority, mailed Feb. 15, 2010, for corresponding International Application No. PCT/GB2009/051469, 13 pages.
First Office Action from State Intellectual Property Office, People's Republic of China, for corresponding Chinese Patent Application No. 200980154344.5, dated Nov. 8, 2012 (8 pages); English translation of Office Action (14 pages).
European Patent Office, Opposition against European Patent No. EP2364412, Dec. 29, 2014, 27 pages.

* cited by examiner

ARMOUR REINFORCEMENT

CROSS REFERENCE TO RELATED APPLICATIONS

This is the U.S. National Stage of International Application No. PCT/GB2009/051469, filed Oct. 30, 2009, which in turn claims the benefit of United Kingdom Application No. GB0820671.6,filed Nov. 12, 2008.

The present invention relates to flexible pipes which may be used to convey fluids such as production fluids or the like. In particular, but not exclusively, the present invention relates to flexible pipe body and a method for manufacturing flexible pipe body having one or more armour layers which are reinforced by a layer of reinforcement tape wound over the armour layer.

Traditionally flexible pipe is utilised to transport production fluids, such as oil and/or gas and/or water, from one location to another. Flexible pipe is particularly useful in connecting a sub-sea location to a further sub-sea location or a sea level location. Flexible pipe is generally formed as an assembly of a length of flexible pipe body and one or more end fittings. The pipe body is typically formed as a composite of tubular layers of material that form a fluid and pressure containing conduit. The pipe structure allows large deflections without causing bending stresses that impair the pipe's functionality over a desired lifetime. The pipe body is generally, but not necessarily, built up as a composite structure including metallic and polymer layers. Flexible pipe may be utilised as a flowline over land and/or at a sub-sea location. Flexible pipe may also be used as a jumper or riser.

In many prior known flexible pipes of this type a "pressure armour layer" is utilised to help reinforce an internal pressure sheath such as a fluid barrier or liner and prevent radial expansion and burst through due to differential pressure conditions acting across the pipe. The pressure armour layer is thus important for the pressure retainment capability of the flexible pipe. The pressure armour layer may also act as a principal reinforcement layer providing collapse resistance.

Typically the pressure armour layer which acts as a hoop strength layer is formed by helically winding one or more tapes about an underlying layer whereby adjacent tape windings interlock, with a claw or hook at one edge of a tape winding interlocking with a corresponding recess or valley region at an opposite edge in an adjacent winding.

Prior known pressure armour profiles are numerous and many have a Zeta or S-shape. One such example is illustrated in the European Patent Application having Publication Number EP 0929767. This discloses a flexible conduit formed with a helically wound tape of metal to provide resistance to burst pressure. The tape has a leading edge lip or hook and a trailing edge hook which engage and interlock when the tape is helically wound.

From time to time flexing of the flexible pipe and differential pressures between an inner bore region and outer environment result in adjacent windings in the pressure armour layer becoming separated in a non-interlocked fashion. This can result in failure of the flexible pipe as an underlying internal pressure sheath or overlying layer can penetrate between the windings. In still further circumstances even when retaining an interlocked arrangement the windings are not able to withstand excessive differential pressures caused either from large pressures outside the flexible pipe or over pressures or sudden pressure drops within the internal bore of the flexible pipe.

Another problem associated with prior art armour profiles is that the materials from which the armour tapes are made and the methods by which the armour tapes are manufactured limits the amount of support which can be given by the layer or layers of interlocked windings. As a result the structural limitations of the flexible pipe body are the cause of limitations on the environments where flexible pipe body may otherwise be used.

Another problem with known armour layers is that relative movement of windings adjacent to each other can over time cause wear of the windings. Wear can lead to failure of a winding and ultimately the flexible pipe body.

It is an aim of the present invention to at least partly mitigate the above-mentioned problems.

It is an aim of embodiments of the present invention to provide flexible pipe body having a reinforced pressure armour layer able to operate effectively even when experiencing significant pressure differentials radially across the pipe body or when the flexible pipe body is highly flexed.

It is an aim of embodiments of the present invention to provide a method and apparatus for reinforcing a pressure armour layer whereby reinforcement tape used to reinforce the pressure armour is held in a fixed relationship to respective windings of a pressure armour layer.

It is an aim of the present invention to provide positive axial location of one or more reinforcement tapes with respect to an underlying pressure vault layer.

According to a first aspect of the present invention there is provided flexible pipe body for transporting production fluids, comprising:

an armour layer comprising interlocked windings of armour tape comprising at least one armour locating element; and
  a reinforcement layer comprising a layer of reinforcement tape comprising at least one reinforcement locating element over the armour layer; wherein
  the armour locating element and reinforcement locating element locate windings of the reinforcement tape with respect to respective windings of the armour tape.

According to a second aspect of the present invention there is provided a method of manufacturing flexible pipe body, comprising the steps of:

winding a reinforcement tape comprising at least one reinforcement locating element over an armour layer comprising interlocked windings of armour tape comprising at least one armour locating element; and
  locating windings of the armour layer with respect to respective windings of the reinforcement layer via the locating elements.

Certain embodiments of the present invention provide positive axial location for a reinforcement tape wrapped around an underlying pressure vault layer. The location of the reinforcement tape relative to the pressure armour layer below prevents gross relative movement of the layers which could otherwise result in wear of either of the layers. This allows the use of a reinforcement layer for fully dynamic applications where relative movement between the pressure vault layer and the reinforcement layer would otherwise be greatest.

Certain embodiments of the present invention provide a low or zero amount of relative movement between a reinforcement layer and an underlying pressure armour layer. This allows the use of two metallic layers in direct contact with each other and removes the need for a separating tape or wear layer between the layers and increases the allowable working contact stress between the layers so providing a higher pressure capacity for the flexible pipe body.

Certain embodiments of the present invention provide a simplified shape for a reinforcing tape of a reinforcing layer which can be manufactured from materials normally associated with tapes used for tensile armour layers rather than pressure vault layers. This allows the use of much higher strength materials. Also smaller tapes may be used to withstand higher pressure differentials than are currently allowable with prior known techniques. The stress distribution over the tape shape may therefore be more evenly distributed than currently possible with prior known techniques.

Embodiments of the present invention will now be described hereinafter, by way of example only, with reference to the accompanying drawings in which.

In the drawings like reference numerals refer to like parts.

Figure 1:
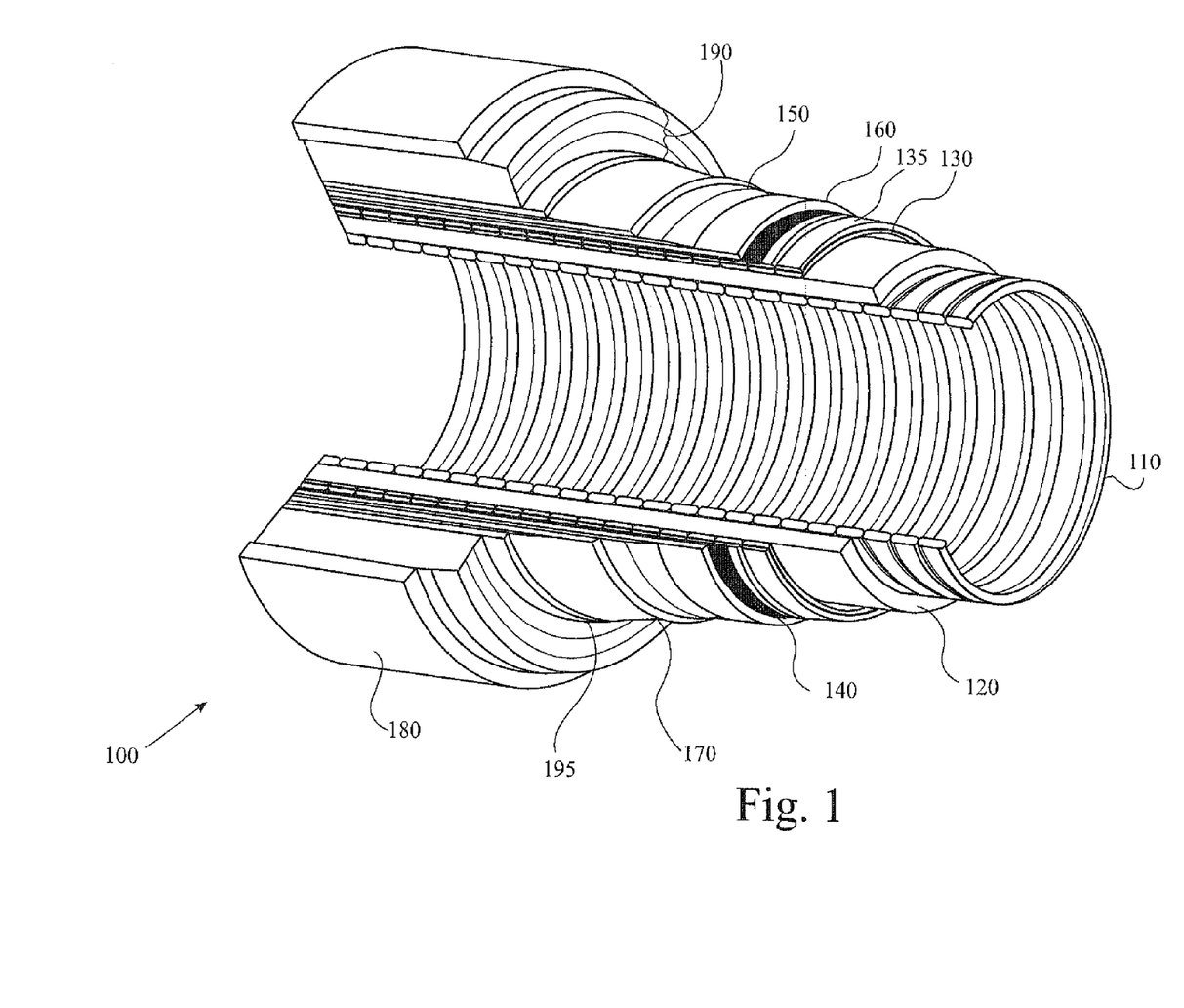
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how flexible pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an innermost carcass layer 110 and a pressure sheath 120. The carcass 110 provides an interlocked metallic construction that can be used as the innermost layer to prevent, totally or partially, collapse of an internal pressure sheath 120 due to pipe decompression, external pressure, tensile armour pressure and mechanical crushing loads. It will be appreciated that embodiments of the present invention are applicable to 'smooth bore' as well as such 'rough bore' applications.

The internal pressure sheath 120 acts as a fluid retaining layer and typically comprises a polymer layer that ensures internal-fluid integrity. It is to be understood that this layer 120 may itself comprise a number of sub-layers. It will be appreciated that when the optional carcass 110 layer is utilised the internal pressure sheath 120 is often referred to as a barrier layer. In operation without such a carcass 110 (so-called smooth-bore operation) the internal pressure sheath 120 may be referred to as a liner.

A pressure armour layer 130 is formed over the internal pressure sheath 120 and is a structural layer with a lay angle close to 90° that increases the resistance of the flexible pipe body 100 to internal and external pressure and mechanical crushing loads. The armour layer 130 also structurally supports the internal-pressure sheath 120 and typically consists of an interlocked metallic construction.

A reinforcement layer 135 is formed over the pressure armour layer. Windings of the reinforcement layer may exactly overlie windings of the pressure armour layer or may partially extend over the joint between the windings.

The flexible pipe body includes a layer of tape 140 overlying the windings of the pressure armour layer and reinforcement layer. This is used to help support the underlying layers.

The flexible pipe body 100 also includes one or more layers of tape 150 and a first tensile armour layer 160 and second tensile armour layer 170. Each tensile armour layer 160, 170 is a structural layer with a lay angle typically between 20° and 55°. Each layer 160, 170 is used to sustain tensile loads and internal pressure. The tensile armour layers 160, 170 are counter-wound in pairs.

The flexible pipe body 100 also includes an outer sheath 180 which comprises a polymer layer used to protect the pipe body 100 against penetration of seawater and other external environments, corrosion, abrasion and mechanical damage. One or more layers 190 of insulation may also be included. Other tape layers 195 may be located between the insulation layers and tensile armour.

Each flexible pipe comprises at least one portion, sometimes referred to as a segment or section of pipe body 100 together with an end fitting located at least one end of the flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
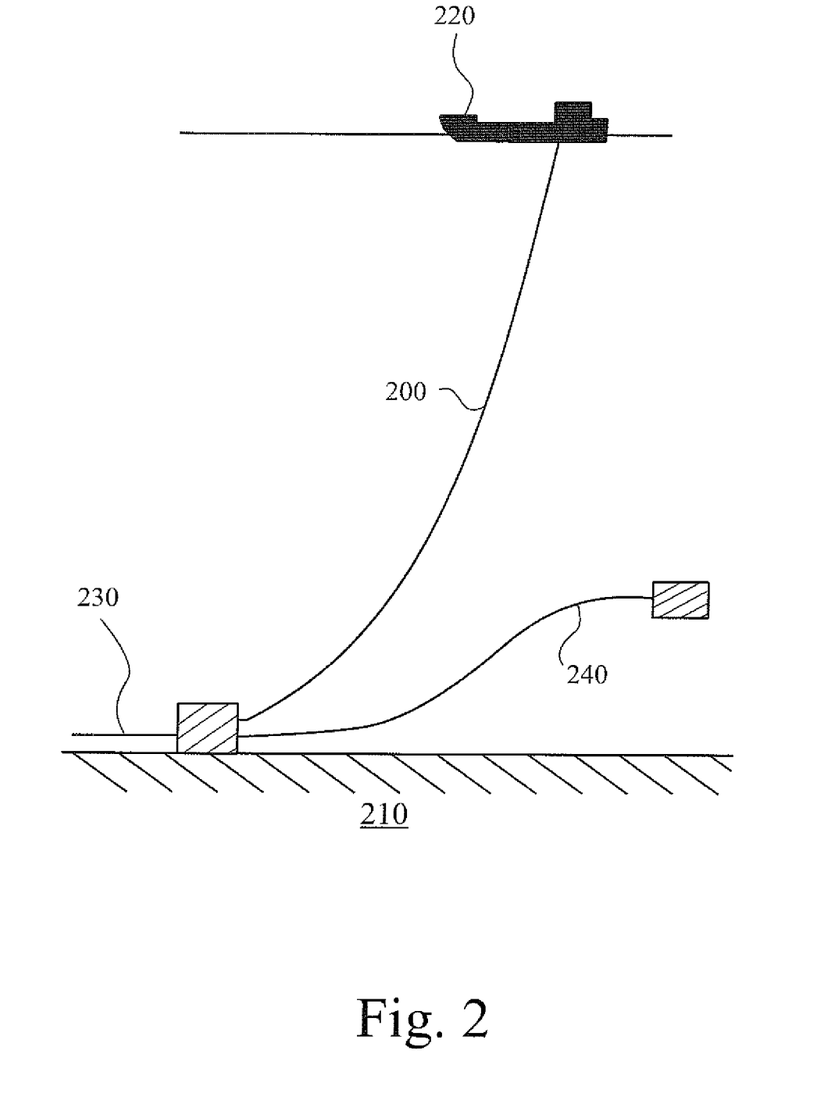
FIG. 2 illustrates a riser, flowline and jumper.

FIG. 2 illustrates a riser assembly 200 suitable for transporting production fluid such as oil and/or gas and/or water from a sub-sea location 210 to a floating facility 220. For example, in FIG. 2 the sub-sea location 210 is a connection to a sub-sea flowline 230. The flexible flowline comprises a flexible pipe, wholly or in part, resting on the sea floor or buried below the sea floor. The floating facility may be provided by a platform and/or buoy or, as illustrated in FIG. 2, a ship. The riser 200 is provided as a flexible riser, that is to say a flexible pipe connecting the ship to the sea floor installation. Alternatively the flexible pipe can be used as a jumper 240.

Figure 3:
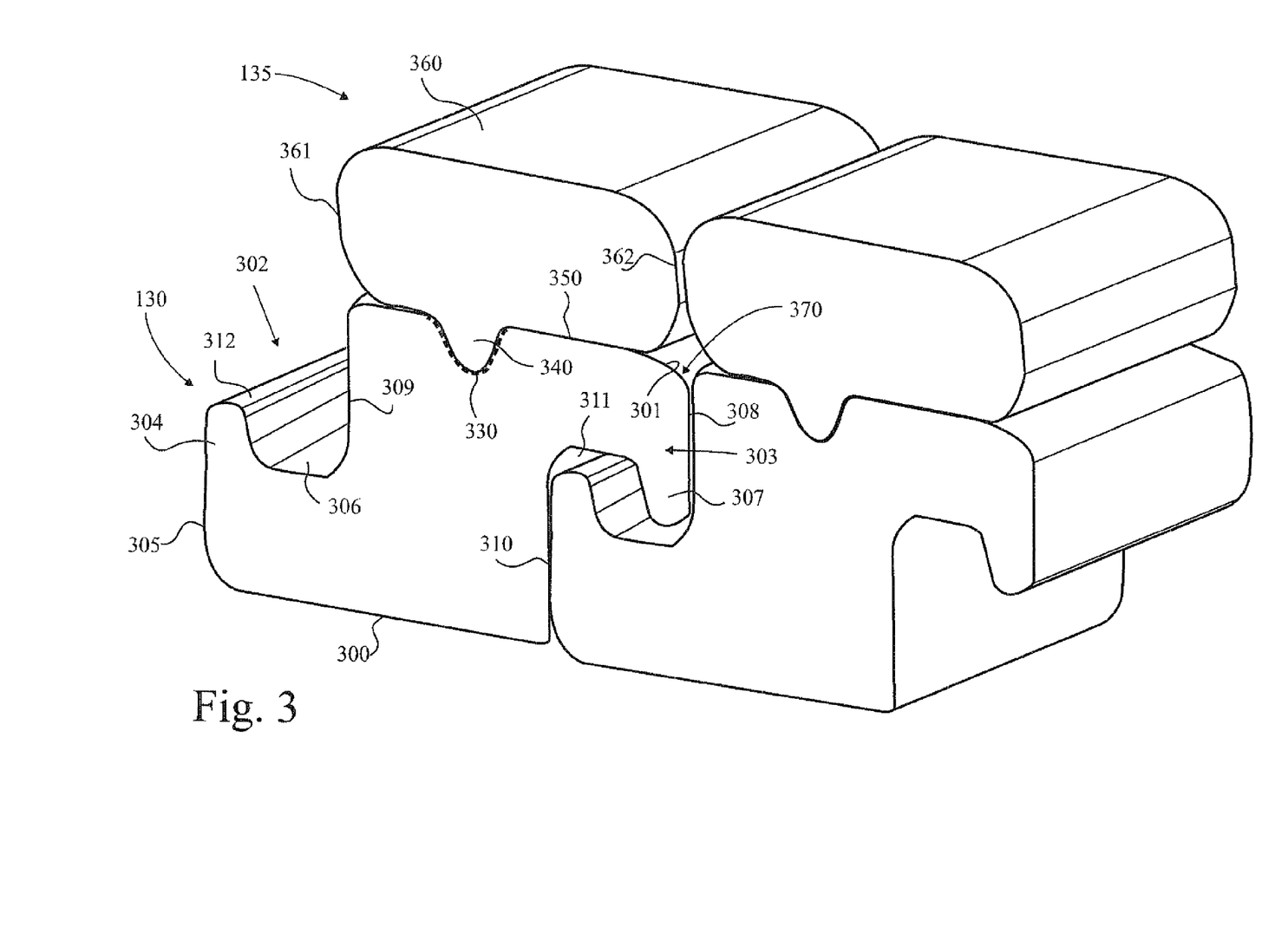
FIG. 3 illustrates a cross sectional view of a pressure armour layer and overlying reinforcement layer.

FIG. 3 illustrates the pressure armour layer 130 and reinforcement layer 135 in more detail according to a first embodiment of the present invention. As shown in FIG. 3 the pressure armour layer 130 is formed by interlocking windings of armour tape having a pre-formed cross section. In the embodiment shown in FIG. 3 the overall cross-section of the armour tape is generally Z-shaped having a substantially flat lower surface 300 which in use sits on an outer surface of an underlying pressure sheath 120. An upper surface 301 is spaced apart from and substantially parallel with the inner surface 300. A generally concave region 302 is formed at a first side of the winding. A generally hook shaped region 303 forms a convex region at a further side of the winding. A lip 304 is generally turned upwards at a sidewall 305 extending upwardly from the base 300. A plateau 306 is formed as a valley at the bottom of the concave region 302. A downwardly turned lip 306 is formed at a peripheral region of the hook 303 of the tape. A sidewall 308 extends between the downwardly turned lip 307 and the upper surface 301. A further sidewall portion 309 extends upwardly from the plateau 306 to the upper surface 301 and likewise a further sidewall portion 310 extends from the downwardly facing plateau region 311 to the lower base 300.

During manufacturing of flexible pipe body a tape having this cross-section is wound over the underlying internal pressure sheath. As the tape is wound a new winding is located so that the hook part 303 of the tape nests in the concave region 302 of a preceding (already in place) winding. The downwardly turned lip 307 of the hook 303 of the new winding extends below an upper surface 312 of the upwardly turned lip 304 of the preceding winding. As such should the flexible pipe flex the adjacent windings are prevented from coming apart since an inner sidewall of the downwardly extending lip 307 abuts with an inner sidewall of the upwardly turned lip 304 of the previous winding. During flexing which causes a compaction of the windings the sidewall 305 on a first side of a previous winding will abut with a sidewall 310 on a second side of the adjacent winding.

Different cross-sections for the armour tape can be utilised according to further embodiments of the present invention. The cross-section is selected so that an abutment surface is provided so that damage is not caused when windings are urged together and likewise adjacent winding are nested together in an interlocking manner to ensure that the windings cannot be completely pulled apart so as to separate from one another.

The upper surface 301 of each winding has a recessed region 330 having a predetermined cross-sectional profile illustrated by the dotted lines shown in FIG. 3. The shape of the recess 330 is selected to mate with a corresponding cross-section of a pin-like extension 340 extending outwardly from an inner surface 350 of a winding of an overlying reinforcement tape. An outer surface 360 of the reinforcement tape is spaced apart from and substantially parallel with the inner surface 350 of the reinforcement tape. Curved side walls 361, 362 on a left and right hand side respectively extend between the inner and outer surfaces 350, 360.

The reinforcement tape has a preformed and predetermined cross-section and during manufacturing is wound over the armour wire layer once the layer 130 has been formed. Alternatively the reinforcement tape can be wound substantially simultaneously with the windings of the armour tape layer. According to still further embodiments of the present invention the reinforcement tape and armour tape may be pre-formed together and then simultaneously wound onto an underlying layer as a unit.

The recess 330 and pin 340 operate to duly locate windings of the reinforcement layer at a desired location with respect to windings of the armour tape layer. As illustrated in FIG. 3 windings of the reinforcement layer are aptly keyed into place with respect to the windings of the armour layer in an entirely overlying manner. In this way as windings of the armour wire layer move sideways with respect to each other the reinforcement tape windings move in a corresponding way. This ensures that there is little or no relative rubbing motion between the lower surface 350 of a reinforcement layer winding and the upper surface 301 of an underlying armour tape layer winding. In this way abrasion of the surfaces of the reinforcement tapes and armour tapes can be obviated wholly or at least partially avoided.

It will be understood that according to certain other embodiments of the present invention reinforcement tape can be located with respect to armour tape windings in a way in which the reinforcement layer windings at least partially or wholly extend across an interface region 370 between adjacent windings in the armour tape layer.

It will be appreciated that whilst the reinforcement layer windings shown in FIG. 3 have a generally rectangular cross-section such a shape is not a limitation of the present invention. Likewise whilst the embodiment shown in FIG. 3 has a downwardly extending pin like formation extending from an inner surface 350 mating with a matching recess 330 in the upper surface of the armour wire layer, the reinforcement tape itself could be formed with the recess with an upper surface of the armour tape layer having a pin like formation. It also to be appreciated that one two or more corresponding recessing and pins may be formed in the upper surface of the armour wire layer and lower surface of the reinforcement layer and that any combination of mating elements can be used to keep the two windings duly located.

Figure 4:
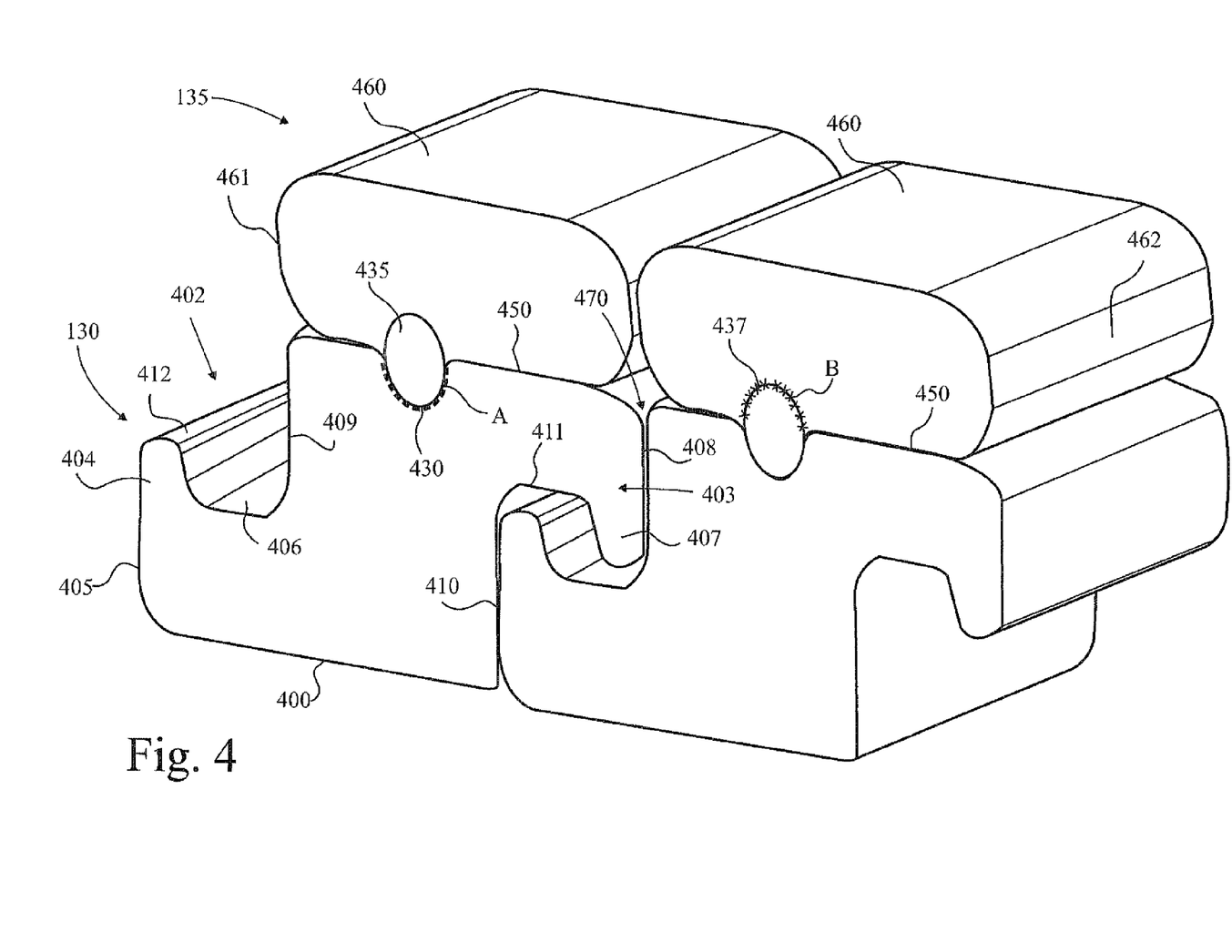
FIG. 4 illustrates an alternative pressure armour layer and overlying reinforcement layer.

FIG. 4 illustrates the pressure armour layer 130 and reinforcement layer 135 in more detail according to a further embodiment of the present invention. As shown in FIG. 4 the pressure armour layer 130 is formed by interlocking windings of armour tape having a pre-formed cross-section. In the embodiment shown in FIG. 3 the overall cross-section of the armour tape is generally Z-shaped having a substantially flat lower surface 400 which in use sits on an outer surface of an underlying pressure sheath 120. An upper surface 401 is spaced apart from and substantially parallel with the inner surface 400. A generally concave region 402 is formed at a first side of the winding. A generally hooked shaped region 403 forms a convex region at a further side of the winding. An upwardly turned lip 404 is generally turned upwards at a sidewall 405 extending upwardly from the base 400. A plateau 406 is formed as a valley at the bottom of the concave region 402. A downwardly turned lip 406 is formed at a peripheral region of the hook 403 of the tape. A sidewall 408 extends between the downwardly turned lip 407 and the upper surface 401. A further sidewall portion 409 extends upwardly from the plateau 406 to the upper surface 401 and likewise a further sidewall portion 410 extends from the downwardly facing plateau region 411 to the lower base 400.

During manufacturing of the flexible pipe body a tape having this cross-section is wound over the underlying internal pressure sheath. As the tape is wound a new winding is located so that the hook part 403 of the tape nests in the concave region 402 of a preceding (already in place) winding. The downwardly turned lip 407 of the hook 403 of the new winding extends below an upper surface 412 of the upwardly turned lip 404 of the preceding winding. As such should the flexible pipe flex in use the adjacent windings are prevented from becoming separated since an inner sidewall of the downwardly extending lip 407 abuts with an inner sidewall of the upwardly turned lip 404 of the previous winding. During flexing which causes a compaction of the windings the sidewall 405 on a first side of a previous winding will abut with a sidewall 410 on a second side of the adjacent winding.

Different cross-sections of the armour tape can be utilised according to further embodiments of the present invention. The cross-section is selected so that an abutment surface is provided so that damage is not caused when windings are urged together and likewise adjacent windings are nested together in an interlocking fashion to ensure that the windings cannot be completely pulled apart so as to separate one from another.

The upper surface 401 of each winding has a recessed region 430 having a predetermined cross-sectional profile illustrated by the dotted lines labelled A shown in FIG. 4. The shape of the recess 430 is selected to mate with a corresponding cross-section of a wire 435. The wire illustrated in FIG. 3 is an elongate element which has a substantially circular cross-section although wires having rectangular, square, hexagonal, U-shaped, X-shaped could be utilised. The wire 435 likewise sits in a recess 437 illustrated by the line of crosses B shown in FIG. 4. This recess is made in an inner surface 450 of an overlying layer of reinforcement tape. An outer surface 460 of the reinforcement tape is spaced apart from and substantially parallel with the inner surface 450 of the reinforcement tape. Curved sidewalls 461, 462 on a left hand side and right hand side of the reinforcement tape respectively extend between the inner and outer surfaces 450, 460.

The reinforcement tape has a preformed and predetermined cross-section and during manufacture is wound over the armour wire layer once the layer 130 has been formed. A wire 435 is likewise wound over the armour wire layer prior to winding the reinforcement tape over both the wire 435 and armour tape. It will be appreciated that alternatively the reinforcement tape can be wound substantially simultaneously with the windings of the armour tape layer and locating wire. According to still further embodiments of the present invention the reinforcement tape, locating wire and armour tape may be pre-formed together and then simultaneously wound onto an underlying layer as a unit. The recess in the top surface of the armour tape, locating wire 435 and recess in the lower surface of the overlying reinforcement tape layer operate to duly locate windings of the reinforcement layer at a desired location with respect to windings of the armour tape layer. As illustrated in FIG. 4 windings of the reinforcement layer are aptly keyed into place with respect to the windings of the armour layer in an entirely overlying manner. In this way as windings of the armour layer move sideways with respect to each other the reinforcement tape windings move in a corresponding way. This ensures that there is little or no relative rubbing motion between the lower surface 450 of a reinforcement layer winding and the upper surface 401 of an underlying armour tape layer winding. In this way abrasion of the surfaces of the reinforcement tapes and armour tapes can be wholly obviated or at least partially avoided.

It will be understood that according to certain other embodiments of the present invention reinforcement tape can be located with respect to armour tape windings in a way in which the reinforcement layer windings at least partially or wholly extend across an interface region 470 between adjacent windings in the armour tape layer.

It will be appreciated that whilst the reinforcement layer windings shown in FIG. 4 have a generally rectangular cross-section such a shape is not a limitation of the present invention. Likewise whilst the embodiment shown in FIG. 4 has a single locating wire acting as a locating element between the armour layer and reinforcement layer one, two or more such locating elements which may share a similar shape but which may have different shapes may be utilised.

The recess and pin of the embodiment illustrated with respect to FIG. 3 and the locating wire and dual recess illustrated in the embodiment shown in FIG. 4 provide positive axial location of a reinforcement tape used for a reinforcement layer with respect to windings of a pressure vault layer located below. The location of the reinforcement tape relative to the layer below prevents gross relative movement of the layers which could otherwise result in wear of one or more of the layers. This allows the use of a reinforcement layer for fully dynamic applications.

The lower amount of relative movement also allows the application of the two metallic layers in direct contact with each other. This removes the need for a separate tape or wear layer between the layers and increases the allowable working contact stress between the layers so providing a higher pressure capacity for the assembly.

Due to the simplified shape of the reinforcing layer tape this can be manufactured from materials normally associated with tensile armour tapes or pressure vault tapes. This allows the use of a much higher strength tape as a reinforcing layer winding.

Smaller tapes may be used to contain higher pressures than are currently permitted with prior art techniques. The stress distribution over the tape shape may also be more evenly distributed than with prior known armour systems.

The design of the reinforcement layer according to certain aspects of the present invention ensures that each reinforcing tape is in contact with only one section of an underlying pressure vault layer. Therefore when the pressure vault elongates or contracts there is no change in the contact of the reinforcement layer.

Aptly the shape and profile of both tapes can be optimised to produce the best performance of the layers. To ensure that the layers function in unison and that the tapes load share it is advantageous though not essential to apply a tension load to the reinforcement layer when applying this during the manufacturing of flexible pipe body. Aptly a tension may be applied to the reinforcement wire such that the pressure vault layer is compressed. This induces compressive loading in the hoop direction which allows use of the flexible pipe body so produced at higher pressures without exceeding the material structural capacity.

It will be appreciated that in the embodiment illustrated in FIG. 4 the rod/wire 435 used as a locating element may additionally be used for other purposes. For example the wire/rod may be a tube which can be used to fit fibre optic gauges for determining strain levels or temperature of the layer. Alternatively if the wire/rod is a tube this may be used to carry an electrical cable to allow the monitoring of the wire position relative to its neighbouring wire from the outside of a completed pipe by using this cable to carry a high frequency or high voltage signal which may be picked up by external monitors (not shown).

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Flexible pipe body for transporting production fluids, comprising:
   an armour layer comprising interlocked windings of armour tape comprising at least one armour locating element, wherein each winding of the armour tape is interlocked with adjacent windings of the armour tape; and
   a reinforcement layer comprising a layer of helically wound reinforcement tape comprising at least one reinforcement locating element over the armour layer; wherein
   windings of the reinforcement tape are keyed into place with respect to the windings of the armour tape in an overlying manner, via the locating elements, such that each winding of the reinforcement tape entirely overlies a radially outermost surface of a corresponding winding of the armour tape but without overlying any adjacent windings of the reinforcement tape and such that, as windings of the armour tape move sideways with respect to each other the windings of the reinforcement tape move in a corresponding way.

2. The flexible pipe body as claimed in claim 1, further comprising:
the armour locating element comprises one of a pin element extending out from the tape or a recess region inset into a cross section of the tape and the reinforcement locating element comprises a remainder one of the pin element or recess region.

3. The flexible pipe body as claimed in claim 2, further comprising:
the pin element nests in the recess region to thereby lock the windings of the reinforcement tape in position with respect to windings of the armour layer.

4. The flexible pipe body as claimed in claim 1, further comprising:
the armour locating element comprises a first recess region inset into the armour tape;
the reinforcement locating element comprises a further recess region inset into the reinforcement tape; and
the reinforcement layer further comprises a locating wire wrapped between the armour layer and reinforcement layer and having a cross section configured to nest in the first and further recess regions.

5. The flexible pipe body as claimed in claim 4, further comprising:
the locating wire locks the windings of the reinforcement tape in position with respect to windings of the armour layer.

6. The flexible pipe body as claimed in claim 5, further comprising:
the locating wire comprises a hollow tube for receiving a fibre optic cable and/or electrical cable.

7. The flexible pipe body as claimed in claim 1, wherein each winding in the armour layer contacts only a respective one region in the overlying reinforcement layer.

8. The flexible pipe body as claimed in claim 1, wherein each winding in the armour layer contacts only a respective one winding in the overlying reinforcement layer.

9. The flexible pipe body as claimed in claim 1, wherein the armour layer and reinforcement layer are un-separated by any intervening layer.

10. The flexible pipe body as claimed in claim 1, wherein the armour layer comprises a pressure armour layer.

11. The flexible pipe body as claimed in claim 1, wherein the armour tape has a substantially S-shaped, Z-shaped or U-shaped cross section.

12. A flexible pipe comprising the flexible pipe body as claimed in claim 1 and at least one end fitting.

13. A jumper, riser or flowline comprising the flexible pipe as claimed in claim 12.

14. A method comprising transporting production fluids through the flexible pipe body as claimed in claim 1.

15. A method of manufacturing flexible pipe body, comprising the steps of:
helically winding a reinforcement tape comprising at least one reinforcement locating element over an armour layer comprising interlocked windings of armour tape comprising at least one armour locating element, wherein each winding of the armour tape is interlocked with adjacent windings of the armour tape; and
keying windings of the reinforcement tape into place with respect to the windings of the armour tape in an overlying manner, via the locating elements, such that each winding of the reinforcement tape entirely overlies a radially outermost surface of a corresponding winding of the armour tape but without overlying any adjacent windings of the reinforcement tape and such that, as windings of the armour tape move sideways with respect to each other, the windings of the reinforcement tape move in a corresponding way.

16. The method as claimed in claim 15, further comprising the steps of:
locating windings by locating a pin element of one of the armour tape or reinforcement tape in a respective recess region of a remainder one of the armour tape or reinforcement tape.

17. The method as claimed in claim 15, further comprising the steps of:
locating windings by winding a locating wire over the armour layer, said locating wire being located in an armour locating element comprising a recess region of the armour tape; and
subsequently winding the reinforcement tape over the armour layer and located wire winding, the reinforcement locating element of the reinforcement tape comprising a recess region for receiving a portion of the previously wound locating wire.

18. The method as claimed in claim 17, further comprising the steps of:
winding the reinforcement tape directly over the armour layer or directly over the armour layer and locating wire.

19. The method as claimed in claim 15, further comprising the steps of:
applying a high tension load to the reinforcement tape of the reinforcement layer as it is wound.

20. The method as claimed in claim 15, further comprising the steps of:
compressing the armour layer via the reinforcement layer.

21. The method as claimed in claim 15, further comprising the steps of:
preventing respective axial movement between the armour layer and reinforcement layer.

22. The method as claimed in claim 17 wherein the locating wire comprises a tubular element, the method further comprising the steps of:
locating an electrical cable and/or optical cable along the inside of the tubular element.

* * * * *